United States Patent [19]
Hostetler

[11] Patent Number: 5,345,407
[45] Date of Patent: Sep. 6, 1994

[54] DIGITAL MULTIBAND FILTER AND METHOD THEREOF

[75] Inventor: David A. Hostetler, Rolling Hills Estates, Calif.

[73] Assignee: Motorola, Inc., Schaumburg, Ill.

[21] Appl. No.: 109,892

[22] Filed: Aug. 23, 1993

[51] Int. Cl.$^5$ ............................................... H04N 9/78
[52] U.S. Cl. .................................. 364/724.01; 348/663
[58] Field of Search ..................... 364/724.01; 348/663

[56] References Cited

U.S. PATENT DOCUMENTS

| | | | |
|---|---|---|---|
| 5,119,179 | 6/1992 | Hagino | 348/663 |
| 5,161,006 | 11/1992 | Monta et al. | 348/663 |
| 5,194,942 | 3/1993 | Sim et al. | 348/663 |
| 5,231,478 | 7/1993 | Fairhurst | 348/663 |
| 5,249,040 | 9/1993 | Sugiyama | 348/663 |

*Primary Examiner*—David H. Malzahn
*Attorney, Agent, or Firm*—Robert D. Atkins

[57] ABSTRACT

A digital multiband filter separates luma data and chroma data from a digitized composite video signal. A multiband filter receives a digital composite video input signal and provides a low-pass response at a first predetermined frequency containing the luma data, a band-pass response between second and third predetermined frequencies containing the chroma data, and a high-pass response. A notch filter rejects the band-pass response from the multiband filter while passing the luma data. A delay circuit delays the multiband output signal to match the delay through the notch filter. A junction circuit subtracts the low-pass response provided from the delayed multiband signal to isolate the chroma data. An alternate embodiment replaces the notch filter with a band-pass filter to provide a band-pass response with the chroma data at its output. The band-pass response is subtracted from the delayed multiband signal for providing the luma data.

20 Claims, 4 Drawing Sheets

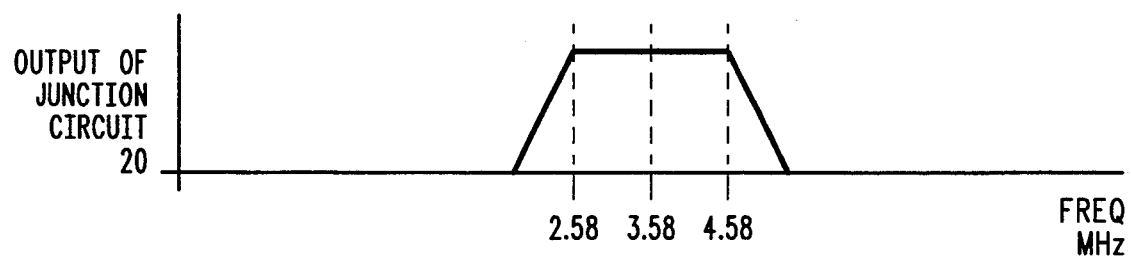
FIG. 8
FIG. 9
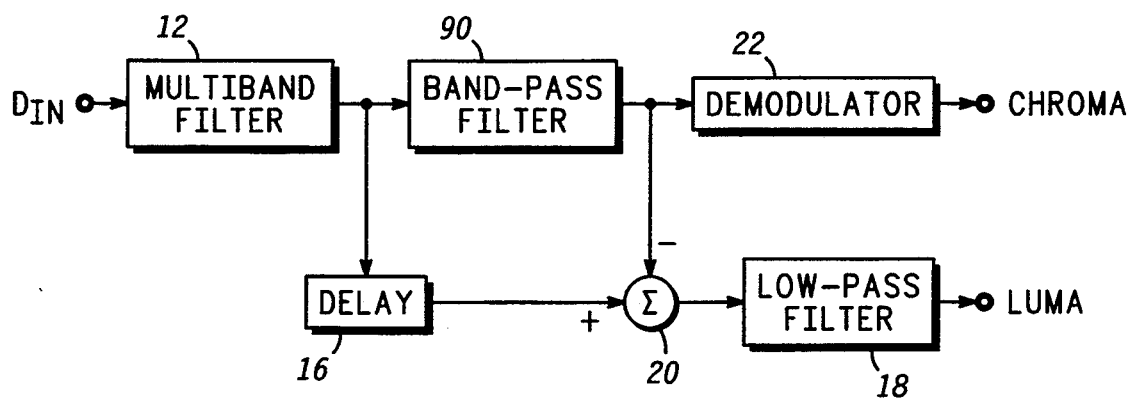

DIGITAL MULTIBAND FILTER AND METHOD THEREOF

BACKGROUND OF THE INVENTION

The present invention relates in general to filter circuits and, more particularly, to a digital multiband filter.

Digital filters are commonly used in electronic circuit design, for example in television systems, to remove undesired frequencies from incoming video signals. A composite video input signal from a television receiver contains luma (brightness) and chroma (color) information. Before any digital processing an analog-to-digital converter must transform the composite video into digital form. The digital filter then separates the luma data from the chroma data, the latter of which is modulated on a 3.58 MHz sub-carrier. The separation is necessary for applications such picture-in-picture systems where the luma data and chroma data must be separately stored in RAM in order to recall a complete picture to display as a reduced size image superimposed on the larger screen image. Such digital filters with a restricted bandwidth may thus be used to separate and extract the desired luma and chroma data signals from the composite video data signal.

One difficulty with digital filters is that they tend to require large areas when implemented on an integrated circuit. The excessive size requirements in prior art digital filters results primarily from the use of separate filters for processing the luma and for processing the chroma information.

Hence, a need exists to reduce the area requirements of a digital filter.

SUMMARY OF THE INVENTION

Briefly stated, the invention comprises a digital filter including a multiband filter having an input receiving a digital input signal and having an output for providing an output signal having a low-pass response at a first predetermined frequency and a band-pass response between second and third predetermined frequencies. A notch filter has an input receiving the output signal of the multiband filter for rejecting the band-pass response while passing the low-pass response at the first predetermined frequency to an output. A first delay circuit includes an input coupled to the output of the multiband filter for providing a delayed multiband signal. A circuit subtracts the low-pass response provided by the notch filter from the delayed multiband signal to isolate the band-pass response.

In another aspect, the present invention is a method of filtering a digital input signal comprising the steps of filtering the digital input signal for providing a multiband output signal having a low-pass response at a first predetermined frequency and a band-pass response between second and third predetermined frequencies, filtering the multiband output signal to reject the band-pass response while passing the low-pass response at the first predetermined frequency, delaying the multiband output signal for providing a delayed multiband signal, and subtracting the low-pass response from the delayed multiband signal for providing the band-pass response isolated from the low-pass response.

In yet another aspect, the present invention is a digital filter comprising a multiband filter having an input receiving a digital input signal and having an output for providing an output signal having a low-pass response at a first predetermined frequency and a band-pass response between second and third predetermined frequencies. A band-pass filter receives the output signal of the multiband filter and rejects the low-pass response at the first predetermined frequency while passing the band-pass response to an output. A first delay circuit includes an input coupled to the output of the multiband filter for providing a delayed multiband signal at an output. A circuit is coupled for subtracting the band-pass response provided by the band-pass filter from the delayed multiband signal to isolate the low-pass response.

BRIEF DESCRIPTION OF THE DRAWING

FIGS. 6–8 are frequency response plots useful in the explanation of the present invention; and FIG. 9 is a block diagram illustrating an alternate embodiment of the digital multiband filter.

DETAILED DESCRIPTION OF THE PREFERRED EMBODIMENT

Figure 1:
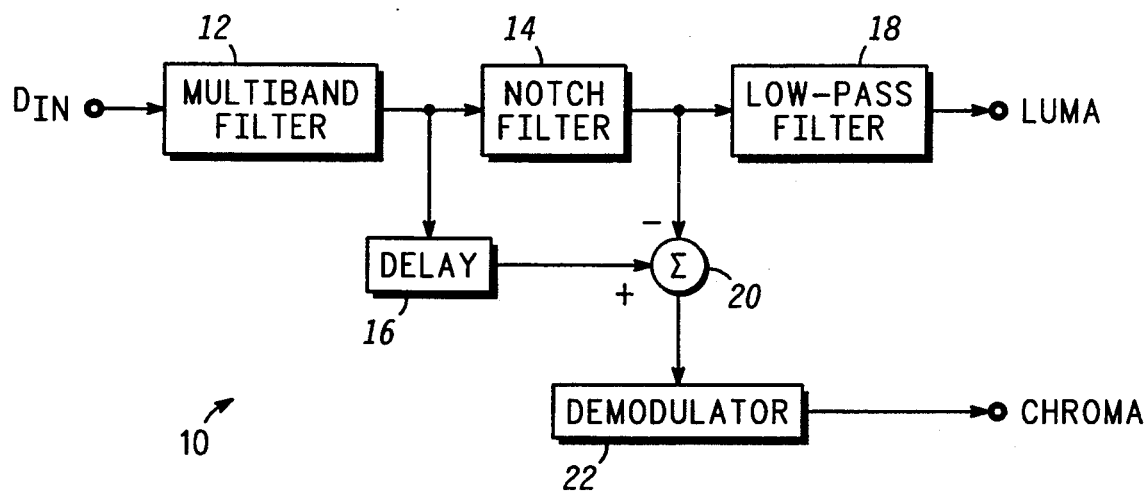
FIG. 1 is a block diagram illustrating a digital multiband filter.

A digital multiband filter 10 is shown in FIG. 1 suitable for manufacturing as an integrated circuit using conventional integrated circuit processes. A digital input signal $D_{IN}$ is applied at the input of multiband filter 12. The $D_{IN}$ input signal may for example represent a digitized composite video signal in a television system, i.e. a composite video signal processed through an analog-to-digital converter (not shown). The analog-to-digital converter and filters described hereinafter operate at approximately 14.318 Msps (megasamples per second). The composite video signal typically contains luma (brightness) and chroma (color) information to control the intensity and color of the television image. The luma data uses varying amplitude to represent brightness, where the higher amplitudes are white and lower amplitudes are black. The chroma data is superimposed as a 3.58 MHz sub-carrier on the luma signal. The chroma signal actually contains two chrominance components modulated in quadrature on the sub-carrier. The phase and amplitude from the demodulated chroma signal relative to a 3.58 MHz reference burst frequency introduced at the beginning of each horizontal scan determines the particular color of the pixels on the television screen.

The output of multiband filter 12 is coupled to an input of notch filter 14 and to an input of delay circuit 16. Delay circuit 16 matches the delay through notch filter 14 although its frequency response is flat. The output of notch filter 14 is processed through low-pass filter 18 for providing the luma data. The output of notch filter 14 is also subtracted from the output signal of delay circuit 16 in junction circuit 20 for providing the modulated chroma data. Demodulator 22 demodulates the chroma data to provide the chrominance components for color as described above. The present invention is especially useful for picture-in-picture applications where the luma and chroma data must be transformed to digital form and separately stored in RAM in order to recall a complete picture to display as a reduced size image superimposed on the larger screen image.

Figure 2:
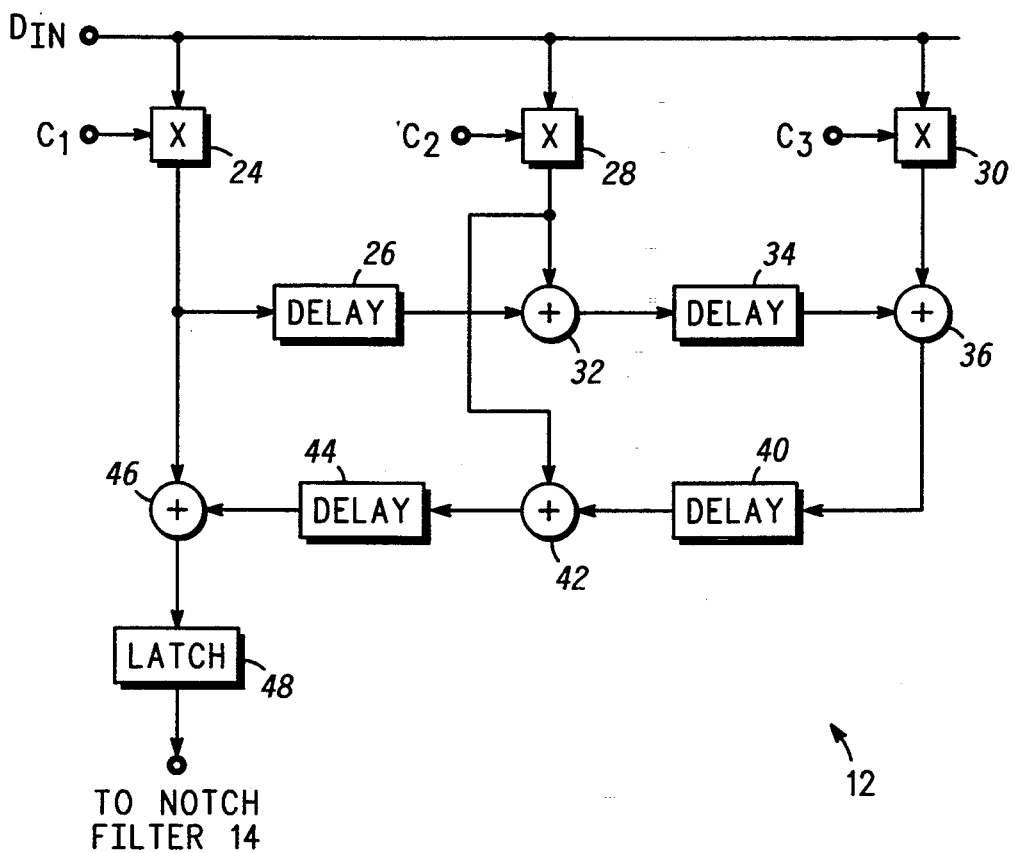
FIG. 2 is a schematic diagram illustrating the multiband filter of FIG. 1.

Multiband filter 12 is shown in further detail in FIG. 2 including digital multiplier 24 having a first input receiving the digital composite video input signal $D_{IN}$ and a second input receiving coefficient $C_1$. The value of coefficient $C_1$ may be set to $-0.0938$. The output of multiplier 24 is coupled to the input of delay circuit 26. Given one unit of delay equal to one sample period of the data (1/(4 * 3.58 MHz burst frequency), or approx. 69.84 nanoseconds), delay circuit 26 is set to have four time units of delay. As noted above, multiband filter 12 operates at 14.318 Msps (4 * 3.58 MHz burst frequency). Delay circuit 26 may include a serially-coupled string of four inverters for each bit in the data path each tuned for one time unit of delay. Alternately, delay circuit 26 may comprise a string of four serially-coupled latches, i.e. a shift register, for each bit in the data path with the delay imposed by clocking on each latch. The $D_{IN}$ signal is also applied at first inputs of digital multipliers 28 and 30, while the second inputs of the same receive coefficients $C_2$ and $C_3$ having values 0.2188 and 0.75, respectively. Multipliers 24, 28 and 30 may be implemented as adder circuits. The output signal of multiplier 28 is summed with the output signal of delay circuit 26 in summing junction 32 and then applied at the input of delay circuit 34.

Similarly, the output signal of multiplier 30 is summed with the output signal of delay circuit 34 in summing junction 36 and then applied at the input of delay circuit 40. Summing junction 42 receives the output signal from multiplier 28 and the output signal from delay circuit 40 and provides a signal to the input of delay circuit 44. Summing junction 46 receives the output signal from multiplier 24 and the output signal from delay circuit 44 and provides a signal to the input of latch 48. The output of latch 48 is coupled to the input of notch filter 14 for providing a low-pass response at and below 1.0 MHz and a band-pass response between 2.58 and 4.58 MHz and a high-pass response above 6.16 MHz. Delay circuits 34, 40 and 44 each have four time units of delay. As noted above, delay circuits 34, 40 and 44 may each comprise a string of four serially coupled latches with the delay imposed by clocking on each latch. Additional stages like multiplier 28, delay circuit 34, summing junction 32, delay circuit 40 and summing junction 42 with corresponding coefficients may be added to modify the frequency response characteristics of multiband filter 12.

Figure 3:
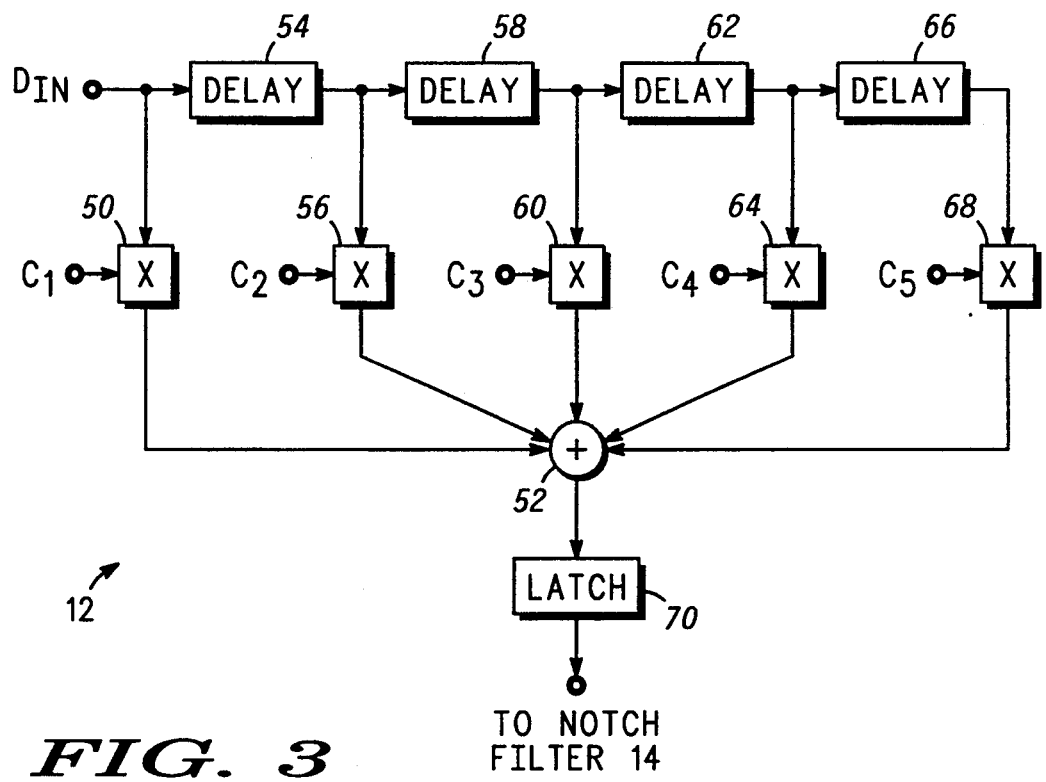
FIG. 3 is a schematic diagram illustrating an alternate embodiment of the multiband filter of FIG. 1.

Turning to FIG. 3, an alternate embodiment of multiband filter 12 is shown including digital multiplier 50 having a first input receiving the digital composite video input signal $D_{IN}$ and a second input receiving coefficient $C_1$. The output of multiplier 50 is coupled to a first input of summing junction 52. The $D_{IN}$ signal is also applied to the input of delay circuit 54. The output of delay circuit 54 is coupled to a first input of digital multiplier 56 and to the input of delay circuit 58. A second input of multiplier 56 receives coefficient $C_2$, while its output is coupled to a second input of summing junction 52. The output of delay circuit 58 is coupled to a first input of digital multiplier 60 and to the input of delay circuit 62. A second input of multiplier 60 receives coefficient $C_3$, while its output is coupled to a third input of summing junction 52. The values of coefficients $C_1$, $C_2$ and $C_3$ may be set to $-0.0938$, 0.2188 and 0.75, respectively. The output of delay circuit 62 is coupled to a first input of digital multiplier 64 and to the input of delay circuit 66. Delay circuits 54, 58, 62 and 66 each have four time units of delay. A second input of multiplier 64 receives coefficient $C_4$, while its output is coupled to a fourth input of summing junction 52. The output of delay circuit 66 is coupled to a first input of digital multiplier 68, while a second input of multiplier 68 receives coefficient $C_5$. The values of coefficients $C_4$ and $C_5$ may be set to 0.2188 and $-0.0938$, respectively. The output of multiplier 68 is coupled to a fifth input of summing junction 52. The output of summing junction 52 is stored in latch 70 and provides a digital output signal having a low-pass response at and below 1.0 MHz, a band-pass response between 2.58 and 4.58 MHz and a high-pass response above 6.16 MHz to notch filter 14.

Figure 4:
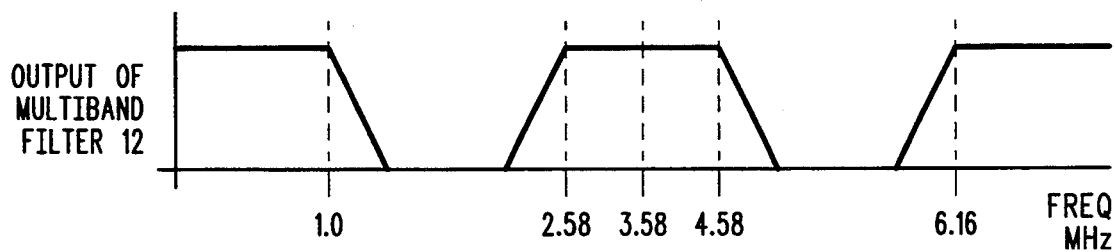
FIG. 4 is a frequency response plot useful in the explanation of the multiband filters of FIGS. 2–3.

The desired frequency response of multiband filter 12 is illustrated in FIG. 4 with a low-pass response at 1.0 MHz and below to pass the luma data and a 2.0 MHz wide band-pass response centered at 3.58 MHz to pass the modulated chroma data. Multiband filter 12 also passes frequencies above 6.16 MHz although typically no useful data appears in that band. For the frequency response shown in FIG. 4, the embodiment of FIG. 2 may further comprise a fourth multiplexer stage (not shown) with coefficients C1–C4 for the four stages selected at $-0.0137$, $-0.0586$, 0.2188 and 0.75, respectively. Alternately, the embodiment of FIG. 3 may comprise a total of seven multiplexer stages (sixth and seventh stages not shown) with coefficients C1–C7 for the seven stages selected at $-0.0137$, $-0.0586$, 0.2188, 0.75, 0.2188, $-0.0586$, and $-0.0137$, respectively.

Figure 5:
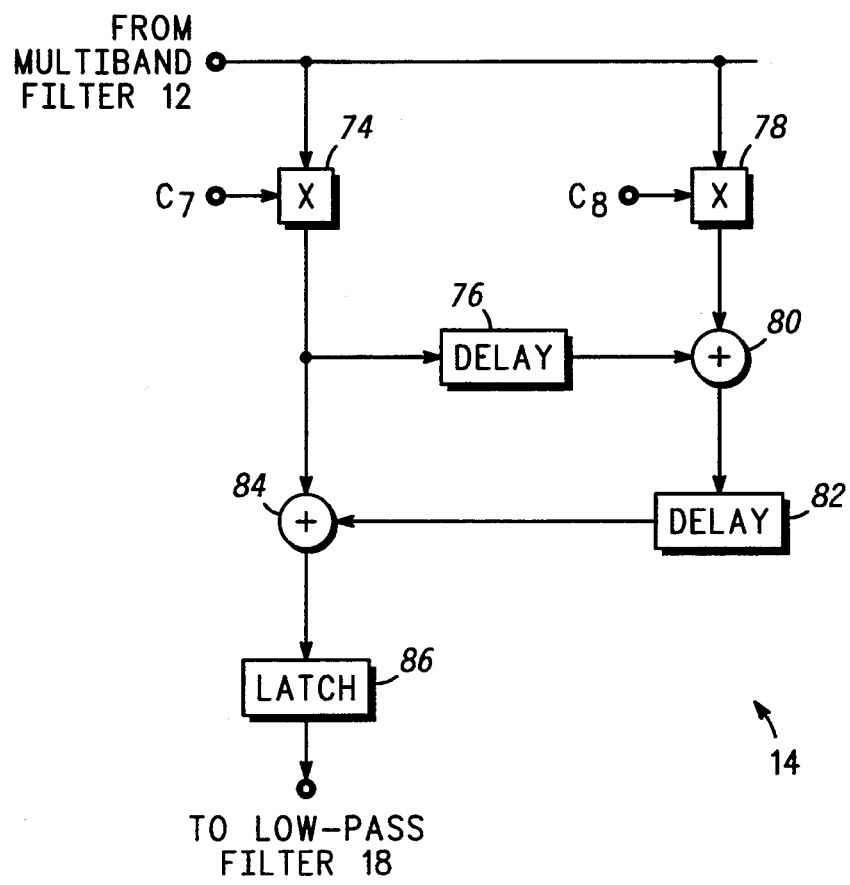
FIG. 5 is a schematic diagram illustrating the notch filter of FIG. 1.

Notch filter 14 is shown in FIG. 5 including digital multiplier 74 having a first input receiving the output signal from multiband filter 12 and a second input receiving coefficient $C_7$. The output of multiplier 74 is coupled to the input of delay circuit 76. The output signal from multiband filter 14 is also applied at a first input of digital multiplier 78, while the second input of the same receives coefficient $C_8$. Multipliers 74 and 78 may be implemented as adder circuits. The values of coefficients $C_7$ and $C_8$ may be set to 0.25 and 0.5, respectively. The output signal of multiplier 78 is summed with the output signal of delay circuit 76 in summing junction 80 and then applied at the input of delay circuit 82. Summing junction 84 receives the output signal from multiplier 74 and the output signal from delay circuit 82 and provides a digital signal rejecting the band-pass response between 2.58 and 4.58 MHz while passing the low-pass response below 1.0 MHz and frequencies above 6.16 MHz to the input of latch 86. The output of latch 86 is coupled to the input of low-pass filter 18.

Figure 6:
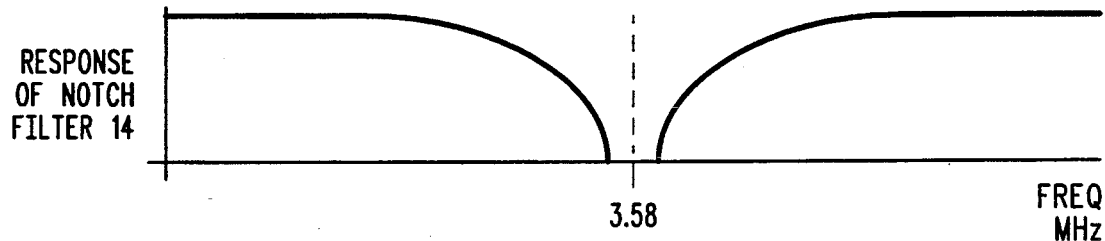
Figure 7:
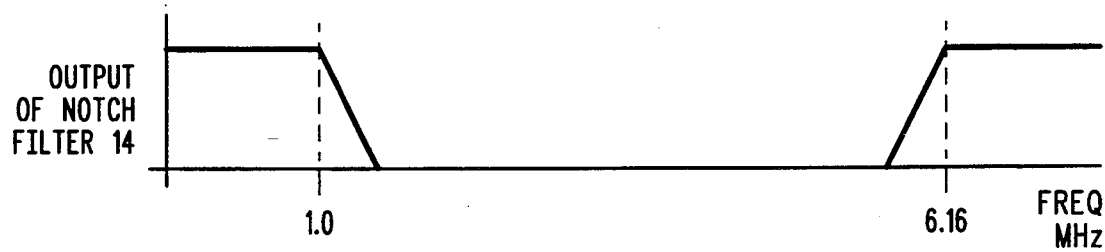

Delay circuits 76 and 82 each have two units of delay. As noted above, delay circuits 76 and 82 may each comprise a string of two serially coupled latches with the delay imposed by clocking on each latch. An alternate embodiment of notch filter 14 may following a similar construction as described in FIG. 3 using three coefficients of value 0.25, 0.5 and 0.25. The delay circuits of FIG. 3 would have two units of delay each to implement notch filter 14. The frequency response of notch filter 14 is illustrated in FIG. 6 with a band-rejection notch centered at 3.58 MHz. Hence, notch filter 14 eliminates the 2.58 to 4.58 MHz band shown in FIG. 4, i.e. the modulated chroma data. The frequency response from $D_{IN}$ through the combination of filter 12 and filter 14, i.e. at the output of notch filter 14, is illustrated in FIG. 7 with a band reject notch between 1.0 MHz and 6.16 MHz.

By low-pass filtering the frequency response shown in FIG. 7, only the useful luma data at 1.0 MHz and below remains at the output of low-pass filter 18. The digital luma data may then be stored in RAM. One embodiment of low-pass filter 18 follows a similar construction as notch filter 14 shown in FIG. 5. Delay circuits like 76 and 82 in low-pass filter 18 involve only one time unit of delay with coefficients $C_7$ and $C_8$ selected at 0.25 and 0.5, respectively. Alternately, low-pass filter 18 may be implemented as shown in FIG. 3 with one time unit per delay circuit and three coefficients set to 0.25, 0.5 and 0.25, respectively.

To isolate the chroma data, the output signal of notch filter 14 is subtracted from the output signal of delay circuit 16. Delay circuit 16 delays the frequency response shown in FIG. 4 to match the time delay through notch filter 14. The signal content at 1.0 MHz and below is removed by the subtraction process as is any signal content above 6.16 MHz. Thus, the subtraction yield only the 2.58 to 3.58 band-pass, i.e. the modulated chroma data at the output of junction circuit 20, as shown in FIG. 7. Demodulator 22 demodulates the chroma data for providing digital chrominance components which can be stored in RAM.

Thus, a principal advantage of the present invention is using a multiband filter to pass luma and chroma data in their corresponding bands and then notch out the band-pass chroma data to isolate the luma data. Subtracting the notched response from a delay multiband signal leaves the chroma data which may then be demodulated to retrieve the digital chrominance components. Using the multiband filter for processing both luma and chroma data reduces the total area needed for the digital filter.

An alternate embodiment of the invention is illustrated in FIG. 9. Components having the same reference number used in FIG. 1 perform a similar function. The digital input signal $D_{IN}$ is applied at the input of multiband filter 12, while the output of multiband filter 12 is coupled to an input of band-pass filter 90 and to an input of delay circuit 16. Delay circuit 16 matches the delay through band-pass filter 90 although its frequency response is flat. The output of band-pass filter 90 is also subtracted from the output signal of delay circuit 16 in junction circuit 20 for providing the luma data. Demodulator 22 demodulates the chroma data to provide the chrominance components for color as described above.

The output signal from multiband filter 12 of FIG. 9 follows the same frequency response shown in FIG. 4. Band-pass filter 90 centered at 3.58 MHz with a 2.0 MHz bandwidth rejects the luma data below 1.0 MHz and any high frequencies above 6.16 MHz, similar to that shown in FIG. 8. Band-pass filter 90 may be implemented as shown in FIG. 5 with coefficient $C_7$ set to −0.25. Delay circuits 76 and 82 would each have two time units of delay. Only modulated chroma data remains at the output of band-pass filter 90. By using junction 20 to subtract the frequency response of FIG. 8 from the frequency response of FIG. 4 at the output of multiband filter 12, and low-pass filtering the result, only the luma data remains at the output of low-pass filter 18.

Thus, another advantage of the present invention is use of a multiband filter to pass luma and chroma data in their corresponding bands and then band-pass to isolate the modulated chroma data which may then be demodulated to retrieve the digital chrominance components. Subtracting the band-pass response from a delay multiband signal leaves the luma data. A low-pass filter isolates the luma data from high frequency components. Again, using the multiband filter to process both luma and chroma data reduces the total area needed for the digital filter.

While specific embodiments of the present invention have been shown and described, further modifications and improvements will occur to those skilled in the art. It is understood that the invention is not limited to the particular forms shown and it is intended for the appended claims to cover all modifications which do not depart from the spirit and scope of this invention.

What is claimed is:

1. A digital filter, comprising:
   a multiband filter having an input receiving a digital input signal and having an output for providing an output signal having a low-pass response at a first predetermined frequency and a band-pass response between second and third predetermined frequencies;
   a notch filter having an input receiving said output signal of said multiband filter for rejecting said band-pass response while passing said low-pass response at said first predetermined frequency to an output;
   a first delay circuit having an input coupled to said output of said multiband filter for providing a delayed multiband signal at an output; and
   circuit means coupled for subtracting said low-pass response provided by said notch filter from said delayed multiband signal to isolate said band-pass response.

2. The digital filter of claim 1 further including a low-pass filter having an input coupled to said output of said notch filter for isolating said low-pass response at an output.

3. The digital filter of claim 1 wherein said circuit means includes a junction circuit having first and second inputs and an output, said first input being coupled to said output of said first delay circuit, said second input being coupled to said output of said notch filter, said output providing said band-pass response isolated from said low-pass response by subtracting said low-pass response provided by said notch filter from said delayed multiband signal.

4. The digital filter of claim 3 wherein said circuit means further includes a demodulator having an input coupled to said output of said junction circuit and having an output for providing a demodulated band-pass response.

5. The digital filter of claim 1 wherein said multiband filter includes:
   a first multiplier having first and second inputs and an output, said first input receiving said digital input signal, said second input receiving a first coefficient;
   a second delay circuit having an input coupled to said output of said first multiplier and having an output;
   a second multiplier having first and second inputs and an output, said first input receiving said digital input signal, said second input receiving a second coefficient;
   a first summing junction having first and second inputs and an output, said first input being coupled to said output of said second delay circuit, said second input being coupled to said output of said second multiplier;

a third delay circuit having an input coupled to said output of said first summing junction and having an output;

a third multiplier having first and second inputs and an output, said first input receiving said digital input signal, said second input receiving a third coefficient; and a second summing junction having first and second inputs and an output, said first input being coupled to said output of said third delay circuit, said second input being coupled to said output of said third multiplier.

6. The digital filter of claim 5 wherein said multiband filter further includes:

a fourth delay circuit having an input coupled to said output of said second summing junction and having an output;

a third summing junction having first and second inputs and an output, said first input being coupled to said output of said fourth delay circuit, said second input being coupled to said output of said second multiplier;

a fifth delay circuit having an input coupled to said output of said third summing junction and having an output;

a fourth summing junction having first and second inputs and an output, said first input being coupled to said output of said fifth delay circuit, said second input being coupled to said output of said first multiplier; and a latch having an input coupled to said output of said fourth summing junction and having an output for providing said output signal of said multiband filter having said low-pass response at said first predetermined frequency and said band-pass response between said second and third predetermined frequencies.

7. The digital filter of claim 1 wherein said notch filter includes:

a first multiplier having first and second inputs and an output, said first input receiving said output signal from said multiband filter, said second input receiving a first coefficient;

a second delay circuit having an input coupled to said output of said first multiplier and having an output;

a second multiplier having first and second inputs and an output, said first input receiving said output signal from said multiband filter, said second input receiving a second coefficient;

a first summing junction having first and second inputs and an output, said first input being coupled to said output of said second delay circuit, said second input being coupled to said output of said second multiplier;

a third delay circuit having an input coupled to said output of said first summing junction and having an output;

a second summing junction having first and second inputs and an output, said first input being coupled to said output of said third delay circuit, said second input being coupled to said output of said first multiplier; and a latch having an input coupled to said output of said second summing junction and having an output coupled to said output of said notch filter for providing said low-pass response at said first predetermined frequency while rejecting said band-pass response between said second and third predetermined frequencies.

8. The digital filter of claim 1 wherein said multiband filter includes:

a first multiplier having first and second inputs and an output, said first input receiving said digital input signal, said second input receiving a first coefficient;

a summing junction having a first input coupled to said output of said first multiplier and having an output;

a second delay circuit having an input receiving said digital input signal and having an output;

a second multiplier having first and second inputs and an output, said first input being coupled to said output of said second delay circuit, said second input receiving a second coefficient, said output being coupled to a second input of said summing junction;

a third delay circuit having an input coupled to said output of said second delay circuit and having an output;

a third multiplier having first and second inputs and an output, said first input being coupled to said output of said third delay circuit, said second input receiving a third coefficient, said output being coupled to a third input of said summing junction; and a latch having an input coupled to said output of said summing junction and having an output for providing said output signal of said multiband filter having said low-pass response at said first predetermined frequency and said band-pass response between said second and third predetermined frequencies.

9. A digital filter, comprising:

a multiband filter having an input receiving a digital input signal and having an output for providing an output signal having a low-pass response at a first predetermined frequency and a band-pass response between second and third predetermined frequencies;

a notch filter having an input receiving said output signal of said multiband filter for rejecting said band-pass response while passing said low-pass response at said first predetermined frequency to an output;

a first delay circuit having an input coupled to said output of said multiband filter for providing a delayed multiband signal at an output; and a junction circuit having first and second inputs and an output, said first input being coupled to said output of said delay circuit, said second input being coupled to said output of said notch filter, said output providing said band-pass response isolated from said low-pass response by subtracting said low-pass response provided by said notch filter from said delayed multiband signal.

10. The digital filter of claim 9 further including a low-pass filter having an input coupled to said output of said notch filter for isolating said low-pass response at an output.

11. The digital filter of claim 9 wherein said multiband filter includes:

a first multiplier having first and second inputs and an output, said first input receiving said digital input signal, said second input receiving a first coefficient;

a second delay circuit having an input coupled to said output of said first multiplier and having an output;

a second multiplier having first and second inputs and an output, said first input receiving said digital input signal, said second input receiving a second coefficient;

a first summing junction having first and second inputs and an output, said first input being coupled to said output of said second delay circuit, said second input being coupled to said output of said second multiplier;

a third delay circuit having an input coupled to said output of said first summing junction and having an output;

a third multiplier having first and second inputs and an output, said first input receiving said digital input signal, said second input receiving a third coefficient; and a second summing junction having first and second inputs and an output, said first input being coupled to said output of said third delay circuit, said second input being coupled to said output of said third multiplier.

12. The digital filter of claim 11 wherein said multiband filter further includes:

a fourth delay circuit having an input coupled to said output of said second summing junction and having an output;

a third summing junction having first and second inputs and an output, said first input being coupled to said output of said fourth delay circuit, said second input being coupled to said output of said second multiplier;

a fifth delay circuit having an input coupled to said output of said third summing junction and having an output;

a fourth summing junction having first and second inputs and an output, said first input being coupled to said output of said fifth delay circuit, said second input being coupled to said output of said first multiplier; and a latch having an input coupled to said output of said fourth summing junction and having an output for providing said output signal of said multiband filter having said low-pass response at said first predetermined frequency and said band-pass response between said second and third predetermined frequencies.

13. The digital filter of claim 9 wherein said notch filter includes:

a first multiplier having first and second inputs and an output, said first input receiving said output signal from said multiband filter, said second input receiving a first coefficient;

a second delay circuit having an input coupled to said output of said first multiplier and having an output;

a second multiplier having first and second inputs and an output, said first input receiving said output signal from said multiband filter, said second input receiving a second coefficient;

a first summing junction having first and second inputs and an output, said first input being coupled to said output of said second delay circuit, said second input being coupled to said output of said second multiplier;

a third delay circuit having an input coupled to said output of said first summing junction and having an output;

a second summing junction having first and second inputs and an output, said first input being coupled to said output of said third delay circuit, said second input being coupled to said output of said first multiplier; and a latch having an input coupled to said output of said second summing junction and having an output coupled to said output of said notch filter for providing said low-pass response at said first predetermined frequency while rejecting said band-pass response between said second and third predetermined frequencies.

14. The digital filter of claim 9 wherein said multiband filter includes:

a first multiplier having first and second inputs and an output, said first input receiving said digital input signal, said second input receiving a first coefficient;

a summing junction having a first input coupled to said output of said first multiplier and having an output;

a second delay circuit having an input receiving said digital input signal and having an output;

a second multiplier having first and second inputs and an output, said first input being coupled to said output of said second delay circuit, said second input receiving a second coefficient, said output being coupled to a second input of said summing junction;

a third delay circuit having an input coupled to said output of said second delay circuit and having an output;

a third multiplier having first and second inputs and an output, said first input being coupled to said output of said third delay circuit, said second input receiving a third coefficient, said output being coupled to a third input of said summing junction; and a latch having an input coupled to said output of said summing junction and having an output for providing said output signal of said multiband filter having said low-pass response at said first predetermined frequency and said band-pass response between said second and third predetermined frequencies.

15. A method of filtering a digital input signal, comprising the steps of:

filtering the digital input signal for providing a multiband output signal having a low-pass response at a first predetermined frequency and a band-pass response between second and third predetermined frequencies;

filtering said multiband output signal to reject said band-pass response while passing said low-pass response at said first predetermined frequency;

delaying said multiband output signal for providing a delayed multiband signal; and subtracting said low-pass response from said delayed multiband signal for providing said band-pass response isolated from said low-pass response.

16. The method of claim 15 further including the step of low-pass filtering said low-pass response to remove any high frequency signal content.

17. A digital filter, comprising:

a multiband filter having an input receiving a digital input signal and having an output for providing an output signal having a low-pass response at a first predetermined frequency and a band-pass response between second and third predetermined frequencies;

a band-pass filter having an input receiving said output signal of said multiband filter for rejecting said low-pass response at said first predetermined frequency while passing said band-pass response to an output;

a first delay circuit having an input coupled to said output of said multiband filter for providing a delayed multiband signal at an output; and circuit means coupled for subtracting said band-pass response provided by said band-pass filter from said delayed multiband signal to isolate said low-pass response.

18. The digital filter of claim 17 wherein said circuit means includes:

a junction circuit having first and second inputs and an output, said first input being coupled to said output of said first delay circuit, said second input being coupled to said output of said band-pass filter, said output providing said low-pass response isolated from said band-pass response by subtracting said band-pass response provided by said band-pass filter from said delayed multiband signal; and a demodulator having an input coupled to said output of said band-pass filter and having an output for providing a demodulated band-pass response.

19. The digital filter of claim 18 further including a low-pass filter having an input coupled to said output of said junction circuit for isolating said low-pass response at an output.

20. The digital filter of claim 17 wherein said band-pass filter includes:

a first multiplier having first and second inputs and an output, said first input receiving said output signal from said multiband filter, said second input receiving a first coefficient;

a second delay circuit having an input coupled to said output of said first multiplier and having an output;

a second multiplier having first and second inputs and an output, said first input receiving said output signal from said multiband filter, said second input receiving a second coefficient;

a first summing junction having first and second inputs and an output, said first input being coupled to said output of said second delay circuit, said second input being coupled to said output of said second multiplier;

a third delay circuit having an input coupled to said output of said first summing junction and having an output;

a second summing junction having first and second inputs and an output, said first input being coupled to said output of said third delay circuit, said second input being coupled to said output of said first multiplier; and a latch having an input coupled to said output of said second summing junction and having an output coupled to said output of said band-pass filter for providing said band-pass response between said second and third predetermined frequencies while rejecting said low-pass response at said first predetermined frequency.

* * * * *